(12) United States Patent
Weant

(10) Patent No.: US 9,758,103 B1
(45) Date of Patent: Sep. 12, 2017

(54) AIR TANK RUNNING BOARDS

(71) Applicant: Justin Layne Weant, Muskogee, OK (US)

(72) Inventor: Justin Layne Weant, Muskogee, OK (US)

(*) Notice: Subject to any disclaimer, the term of this patent is extended or adjusted under 35 U.S.C. 154(b) by 0 days.

(21) Appl. No.: 15/188,595

(22) Filed: Jun. 21, 2016

Related U.S. Application Data

(60) Provisional application No. 62/198,338, filed on Jul. 29, 2015.

(51) Int. Cl.
*B60R 3/00* (2006.01)
*B62D 21/16* (2006.01)

(52) U.S. Cl.
CPC .............. *B60R 3/002* (2013.01); *B62D 21/16* (2013.01)

(58) Field of Classification Search
CPC .................. B60R 3/002; B62D 21/16
See application file for complete search history.

(56) References Cited

U.S. PATENT DOCUMENTS

| | | | | |
|---|---|---|---|---|
| 1,394,076 A | * | 10/1921 | Fitz Gibbon | ....... B60K 17/10 180/302 |
| 2,236,507 A | * | 4/1941 | Kreits | ............. B60R 19/20 293/107 |
| 3,764,174 A | * | 10/1973 | Taninecz | ............. B21D 3/14 188/372 |
| 3,880,445 A | * | 4/1975 | Chieger | ............. B60G 5/00 280/762 |
| 4,311,320 A | | 1/1982 | Waters, Jr. | |
| 6,017,045 A | | 1/2000 | Dermody | |
| 6,726,230 B2 | | 4/2004 | Weir | |
| 6,910,700 B2 | | 6/2005 | Kayne | |
| 8,002,298 B2 | | 8/2011 | Casbolt et al. | |
| 8,528,925 B2 | | 9/2013 | McFarlane | |
| 9,248,797 B2 | * | 2/2016 | Odate | ............. B60R 21/017 |
| 2012/0218095 A1 | * | 8/2012 | Zhou | ............. B60C 29/064 340/447 |

FOREIGN PATENT DOCUMENTS

AU 2004101010 A4 * 12/2004

* cited by examiner

*Primary Examiner* — John Walters
*Assistant Examiner* — James Triggs
(74) *Attorney, Agent, or Firm* — Margaret S. Millikin; Molly D. McKay

(57) ABSTRACT

The present invention is an air tank running board. The running boards are tubular and the running boards also double as compressed air tanks. Each running board is provided with a hollow interior that is sealed at one end and has a ¼ NPT threaded pipe on its opposite end that communicates between the hollow interior of the tank and the exterior of the tank. The threaded pipe of each running board is connected to a mounted manifold with regulator so that the running board tanks can be pressurized to a desired pressure. The tubular running boards can be used as steps or step structures can be added to them.

8 Claims, 1 Drawing Sheet

AIR TANK RUNNING BOARDS

CROSS-REFERENCE TO RELATED APPLICATIONS

The present application claims priority to U.S. Provisional Patent Application No. 62/198,338 for Air Tank Running Boards filed on Jul. 29, 2015.

BACKGROUND OF THE INVENTION

1. Field of the Invention

The present invention relates to running boards for attachment to a vehicle such as a pickup truck. More specifically, the invention relates to hollow running boards that also serve as air tanks. The air tanks are attached to a mounted manifold with regulator so that the air pressure within the hollow air tanks of the running boards can be controlled and so that air pressure can be used to air up tires or for other purposes when needed.

2. Description of the Related Art

Although air compressors can be mounted onto a vehicle to provide compressed air when needed, often it would be desirable just to have sufficient compressed air in order to air up a tire rather than go to the expense and trouble of having a dedicated compressor on the vehicle. And although a compressed air tank could be carried in a vehicle or mounted underneath a vehicle, this would be added expense and weight.

The present invention addresses this need by providing tubular running boards that also double as compressed air tanks. Each running board is provided with a hollow interior that is sealed at one end and has a ¼ NPT threaded pipe on its opposite end that communicates between the hollow interior of the tank and the exterior of the tank. The threaded pipe of each running board is connected to a mounted manifold with regulator so that the running board tanks can be pressurized to a desired pressure.

SUMMARY OF THE INVENTION

The present invention are air tank running boards. The running boards are tubular and the running boards that also double as compressed air tanks. Each running board is provided with a hollow interior that is sealed at one end and has a ¼ NPT threaded pipe on its opposite end that communicates between the hollow interior of the tank and the exterior of the tank. The threaded pipe of each running board is connected to a mounted manifold with regulator so that the running board tanks can be pressurized to a desired pressure.

DETAILED DESCRIPTION OF THE PREFERRED EMBODIMENT

Figure 1:
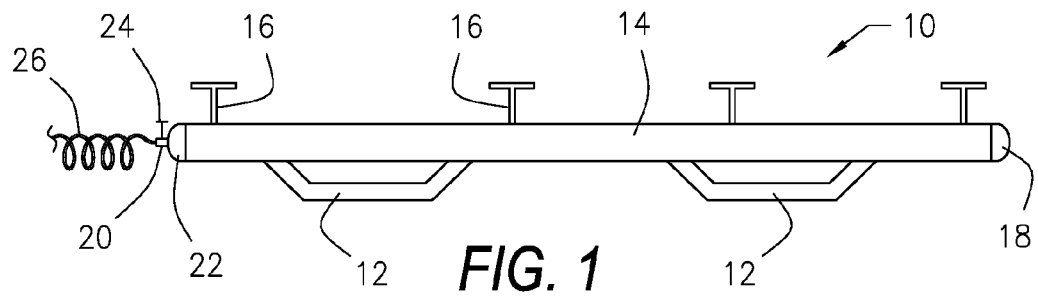
FIG. 1 is a top plan view of an air tank running board that is constructed in accordance with a preferred embodiment of the present invention.

Referring now to the drawings and initially to FIG. 1, there is illustrated an air tank running board 10 that is constructed in accordance with a preferred embodiment of the present invention. The air tank running board 10 that is shown in FIG. 1 is provided with miter-cut steps 12.

Figure 2:
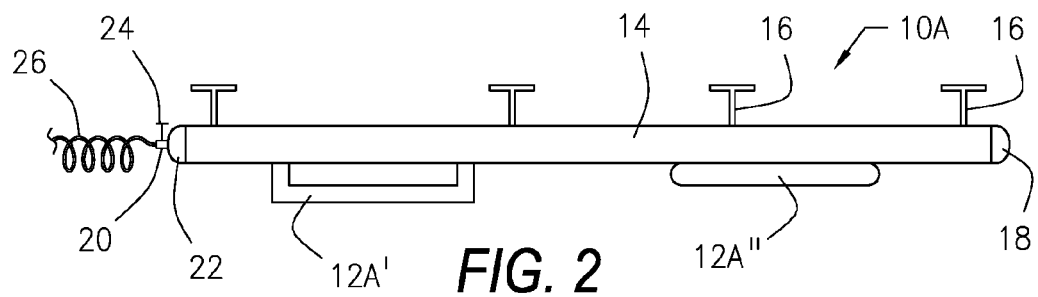
FIG. 2 is a top plan view of an air tank running board that is constructed in accordance with a first alternate embodiment of the present invention.

Referring to FIG. 2, a first alternate embodiment air tank running board 10A is shown that has a square cut step 12A' and also a pipe or plate 12A" that is welded onto the running board 10A for a second step.

Figure 3:
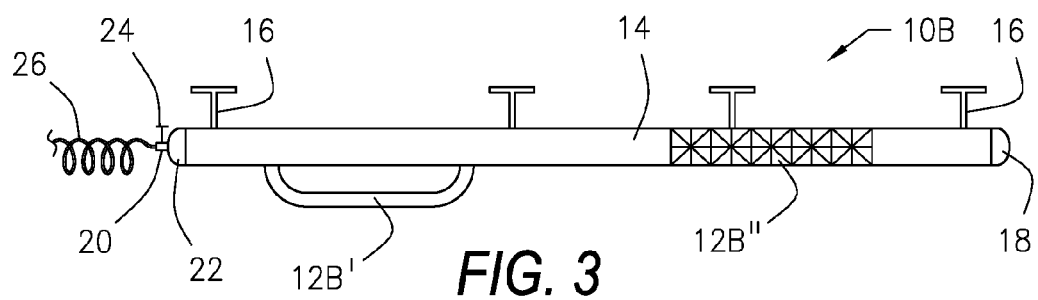
FIG. 3 is a top plan view of an air tank running board that is constructed in accordance with a second alternate embodiment of the present invention.

Referring to FIG. 3 a second alternate embodiment air tank running board 10B is shown that has a bent tubing step 12B' and also grip tape 12B" applied directly to the running board for a second step.

Although various styles of steps 12, 12A', 12A", 12B' and 12B" have been illustrated, the invention is not limited to these specific styles. Also, although the drawings illustrate only two steps 12, 12A', 12A", 12B' and 12B" attached to each cylindrical tube 14, the invention is not so limited and additional steps 12, 12A', 12A", 12B', 12B", etc. can be employed on each tube 14. Also, a cylindrical tube 14 can be provided with only one step, if desired.

Each of the air tank running boards 10, 10A and 10B that are shown in FIGS. 1-3 is constructed of the cylindrical tube 14 that is provided with mounting brackets 16 for mounting the running board 10, 10A and 10B to a vehicle (not illustrated). The cylindrical tube 14 of each of the running boards 10, 10A and 10B also doubles as a compressed air tank. Each cylindrical tube 14 is provided with a hollow interior that is sealed at one end 18 and has a ¼ NPT threaded pipe 20 on its opposite second end 22 that communicates between the hollow interior of the cylindrical tube 14 and the exterior of the tube 14. Preferably attached to each threaded pipe 20 is a shut-off valve 24 for isolating the tube 14 from the surrounding air.

Figure 4:
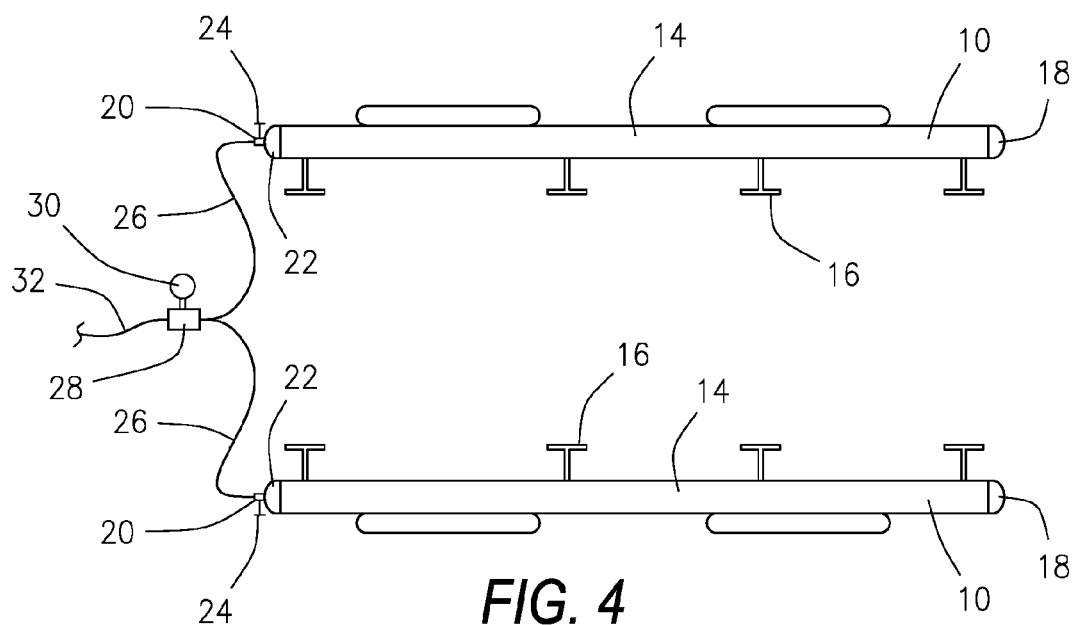
FIG. 4 is a diagram showing the piping connecting a pair of air tank running boards to a vehicle-mounted manifold with regulator.

As shown in FIG. 4, the threaded pipe 20 of each running board 10, 10A and 10B is connected via air line 26 to a manifold 28 with regulator 30 that is mounted on the vehicle. In the arrangement shown in FIG. 4, the running boards 10, 10A and 10B are mounted on either side of the vehicle and the running board tubes 14 can be pressurized to a desired pressure via the manifold 28. The manifold 28 may be provided with an air supply line 32 that can be connected to an air compressor (not illustrated) for filing the tubes 14 with compressed air.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. An air tank running board comprising:
   a cylinder provided with mounting brackets for mounting the cylinder to a vehicle as a running board for the vehicle, the cylinder being hollow internally and being closed on a first end and provided with a closable opening on a second end as a means of introducing pressurized air within the cylinder,
   an air line attaching to the closable opening on the second end of the cylinder and attaching to a manifold, and
   a regulator provided on the manifold.

2. An air tank running board according to claim 1 further comprising:
an air supply line attached to the manifold for supplying compressed air to the cylinder via the manifold.

3. An air tank running board comprising:
a cylinder provided with mounting brackets for mounting the cylinder to a vehicle as a running board for the vehicle, the cylinder being hollow internally and being closed on a first end and provided with a closable opening on a second end as a means of introducing pressurized air within the cylinder,
at least one step provided on the cylinder,
an air line attaching to the closable opening on the second end of the cylinder and attaching to a manifold, and
a regulator provided on the manifold.

4. An air tank running board according to claim 3 further comprising:
an air supply line attached to the manifold for supplying compressed air to the cylinder via the manifold.

5. An air tank running board system comprising:
two cylinders provided with mounting brackets for mounting the cylinders on either side of a vehicle as running boards for the vehicle, each of the cylinders being hollow internally and being closed on a first end and provided with a closable opening on a second end as a means of introducing pressurized air within the cylinders,
air lines attaching to each of the two cylinders via the closable openings provided on the second ends of the two cylinders,
each air line attaching to a common manifold that is secured to the vehicle, and
a regulator provided on the common manifold.

6. An air tank running board system according to claim 5 further comprising:
an air supply line attached to the manifold for supplying compressed air to the two cylinders via the manifold.

7. An air tank running board system comprising:
two cylinders provided with mounting brackets for mounting the cylinders on either side of a vehicle as running boards for the vehicle, each of the cylinders being hollow internally and being closed on a first end and provided with a closable opening on a second end as a means of introducing pressurized air within the cylinders,
at least one step provided on each of the two cylinders,
air lines attaching to each of the two cylinders via the closable openings provided on the second ends of the two cylinders,
each air line attaching to a common manifold that is secured to the vehicle, and
a regulator provided on the manifold.

8. An air tank running board system according to claim 7 further comprising:
an air supply line attached to the common manifold for supplying compressed air to the two cylinders via the common manifold.

\* \* \* \* \*